United States Patent [19]
Giacomini

[11] Patent Number: 5,956,239
[45] Date of Patent: Sep. 21, 1999

[54] SWITCHING CURRENT MODE CONVERTER WITH REDUCED TURN-ON DELAY OF POWER DEVICES

[75] Inventor: Davide Giacomini, Valdengo, Italy

[73] Assignee: STMicroelectronics S.r.l., Agrate Brianza, Italy

[21] Appl. No.: 09/154,762

[22] Filed: Sep. 17, 1998

[30] Foreign Application Priority Data

Sep. 19, 1997 [EP] European Pat. Off. .............. 97830459

[51] Int. Cl.[6] .......................... H02M 3/335; H02M 3/24; H02M 7/5387
[52] U.S. Cl. ................................ 363/17; 363/98; 363/132
[58] Field of Search ................................. 363/16, 95, 98, 363/132, 17

[56] References Cited

U.S. PATENT DOCUMENTS

| | | | |
|---|---|---|---|
| 4,975,820 | 12/1990 | Szepesi ........................................ | 363/21 |
| 5,047,914 | 9/1991 | Dhyanchand et al. ..................... | 363/98 |
| 5,189,601 | 2/1993 | Sellers ....................................... | 363/132 |
| 5,406,468 | 4/1995 | Booth ........................................ | 363/21 |

OTHER PUBLICATIONS

Frank Goodenough, "Fast LDOs and Switchers Provide Sub–5–V Power," Electronic Design, vol. 43, No. 18, Sep. 5, 1995, pp. 65, 66, 68, 70, 72 and 74.

Patent Abstracts of Japan, vol. 015, No. 371, (E–1113), Sep. 18, 1991, and JP 03 145968A, Mitsubishi Electric Corp., Jun. 21, 1991.

*Primary Examiner*—Peter S. Wong
*Assistant Examiner*—Bao Q. Vu
*Attorney, Agent, or Firm*—Allen, Dyer, Doppelt, Milbrath & Gilchrist, P.A.

[57] ABSTRACT

The turn-on delay of a current mode switching converter is reduced by an error summing block including a window comparator to the input of which is fed the output voltage of the converter before being filtered by the low pass filter and to which a low threshold and high threshold reference voltages are applied, both of which are referred to the reference voltage of the converter. The error summing block also includes a differentiating circuit whose input is coupled to the so defined "under" output of the window comparator and outputting a pulse of a preestablished duration at the incoming of a rising front of the input signal. Two amplifiers of the same gain K, are also provided, and both are enableable for outputting an amplified signal only when enabled. In addition, two summing circuits are also included. One summing circuit adds the reference signal of the converter (Vref), and the other the feedback signal of the output voltage filtered by the low pass filter to the respective signals amplified by the enabling amplifiers when enabled.

17 Claims, 7 Drawing Sheets load transient load transient

SWITCHING CURRENT MODE CONVERTER WITH REDUCED TURN-ON DELAY OF POWER DEVICES

FIELD OF THE INVENTION

The invention relates in general to switching DC—DC converters controlled in a current mode, and, more particularly, to techniques for speeding up the circuit response to sudden load variations in demanding applications.

BACKGROUND OF THE INVENTION

New generations of microprocessors are continuously evolving. The need for processing an ever increasing amount of information in shorter and shorter times is leading the manufacturers of these devices to lower the voltage supply and increase the input current requirement. Accordingly, modern microprocessors may require currents of many amperes (up to 50 A at present), not in a continues manner, but determined by the amount of operations to be processed at a certain instant. Therefore, the current absorbed may change from tens of mA to 10–12 A in a few nanoseconds. A common slew rate requirement is of about 5 A/ns which is generally fulfilled using an array of large capacitors, often placed in the socket mount of the microprocessor.

This approach does not relieve the power supply from quickly responding to the sudden need for current. In addition, the slew rate value which at present seems to be needed to maintain a stable level of the supply voltage of the array of capacitors is of about 30 A/μs, a quite respectable figure which is not easily ensured.

The manufacturers of power supplies are adopting particular approaches in trying to speed up the response of switching DC—DC converters used therein. Current mode converters are by far the most widely used because of their good response characteristics. However, they require the use of a current sensing resistor of few Ohms connected in series to the inductor. The sensing resistor leads to a power dissipation, which increases with the square of the output current of a DC—DC step-down converter, and is, thus, becoming more and more unacceptable.

Accordingly, voltage mode approaches are gaining ground because they do not require such a dissipating sensing resistor. However, due to their slow response, they require special "tricks" to attain an acceptable speed of response.

A commonly adopted approach includes placing two comparators about the reference voltage of the system. These comparators continuously check the real output voltage and act on the control loop at the instant in which a certain range is exceeded. At present this is implemented in the commercial converters LTC1430 and LTC1553 manufactured by Linear Technology and in the series of devices 4900/01/02 of Microlinear, all functioning in a voltage mode.

The response time of current mode converters is normally in the vicinity of a few clock cycles and therefore no need has ever been felt in the past for increasing their response speed. Moreover, new current control techniques have made these types of converters an interesting approach even for high current applications (for instance, the technique of exploiting the RdsON of the external power MOS transistor for sensing the current). In view of slew rate requirements as those cited above, it may become necessary to improve even the already fast response time of current mode converters to attain delay times that do not exceed a few hundred nanoseconds before the turn-on of the external MOS transistor occurs.

FIG. 1 shows the scheme of a prior art current mode Buck converter. In the ensuing description reference will be made to this circuit topology even though the invention is similarly applicable to any other topology of switching converters, operating in a current mode.

The block indicated with the symbol Σ is the so called "error summing" block, whose internal diagram is shown in FIG. 2. This block Σ is responsible for stabilizing the system and for the precision of the output voltage. Indeed, this block Σ decides when to turn-off or turn-on the power transistors Hside and Lside of the switching converter.

The block Σ receives three distinct differential input signals: the error voltage of the comparison between the reference voltage and the output of the converter (Vref-Vfb), the potential difference (Isense-Vsense) on the sensing resistor connected in series with the output inductor Lf of the converter, and the voltage signal (slope+ slope−) coming from the sawtooth oscillator which creates the ramp compensation. The error summing block Σ governs the turn-off of the power transistor Hside when the sum of the three contributing signals, with the indicated signs, reaches the zero value.

The low pass filter, LP-Filter, placed between the converter output and the error summing block Σ is needed for stabilizing the system. The pole introduced by the filter may range from a few kHz to tens of kHz, depending on the application.

The PWM-control-block manages all the control signals coming from the analog parts (zero-crossing comparators, under/over-voltage, etc.) and from the error summing block Σ itself and generates the signals for the MOS driver block which directly drives the external power MOS transistors. To obtain systems operating at a constant frequency while the turn-off of the external MOS (Hside) is totally asynchronous and controlled by the signal Ersum signal, the turn-on cannot take place at any successive instant but rather, only in synchronism with the clock.

Unfortunately, this characteristic introduces a certain turn-on delay, whose maximum value is equal to the clock period. In other words, if the signal Ersum decided that a turn-on must take place again a few nanoseconds after a clock pulse, the turn-on may occur only at the next pulse and not immediately as decided by the signal Ersum.

FIG. 2 is the diagram of the error summing block Σ. The blocks X0, X1 and X2 usually are amplifiers of a very low gain (of a few units or of unity gain) and their contribution is summed in block X14 to produce a signal which is compared with the zero (gnd) by the output comparator XS, thus converting the information into the form of a logic signal (signal outesc).

SUMMARY OF THE INVENTION

A simple and efficient circuit in accordance with the invention significantly reduces the turn-on delay on the order of the clock period as normally associated with a current mode switching converter, according to the prior art.

This important result is attained, according to the present invention, by modifying the error summing block as it is normally realized according to known techniques, substantially without materially increasing its circuit complexity.

Essentially, additional blocks are placed upstream of the inputs of the error amplifier between the reference voltage and output voltage of the converter. These additional blocks may comprise:

a window comparator to the input of which input is fed the output voltage of the converter before being filtered by the low pass filter, and to which a low threshold and high threshold reference voltage are applied, both of which are referred to the reference voltage of the converter. The window comparator is fully differential and has a first and a second output, defined "under" and "over", respectively;

a differentiating circuit whose input is coupled to the so defined "under" output of the window comparator and outputting a pulse of a preestablished duration at the incoming of a rising front of the input signal (under);

two amplifiers of the same gain K, both being enableable for outputting an amplified signal only when they are enabled; and two summing circuits, one adding the reference signal of the converter (Vref), and the other the feedback signal of the output voltage filtered by the low pass filter to the respective signals amplified by the enabling amplifiers when enabled.

DETAILED DESCRIPTION OF THE PREFERRED EMBODIMENTS

Figure 1:
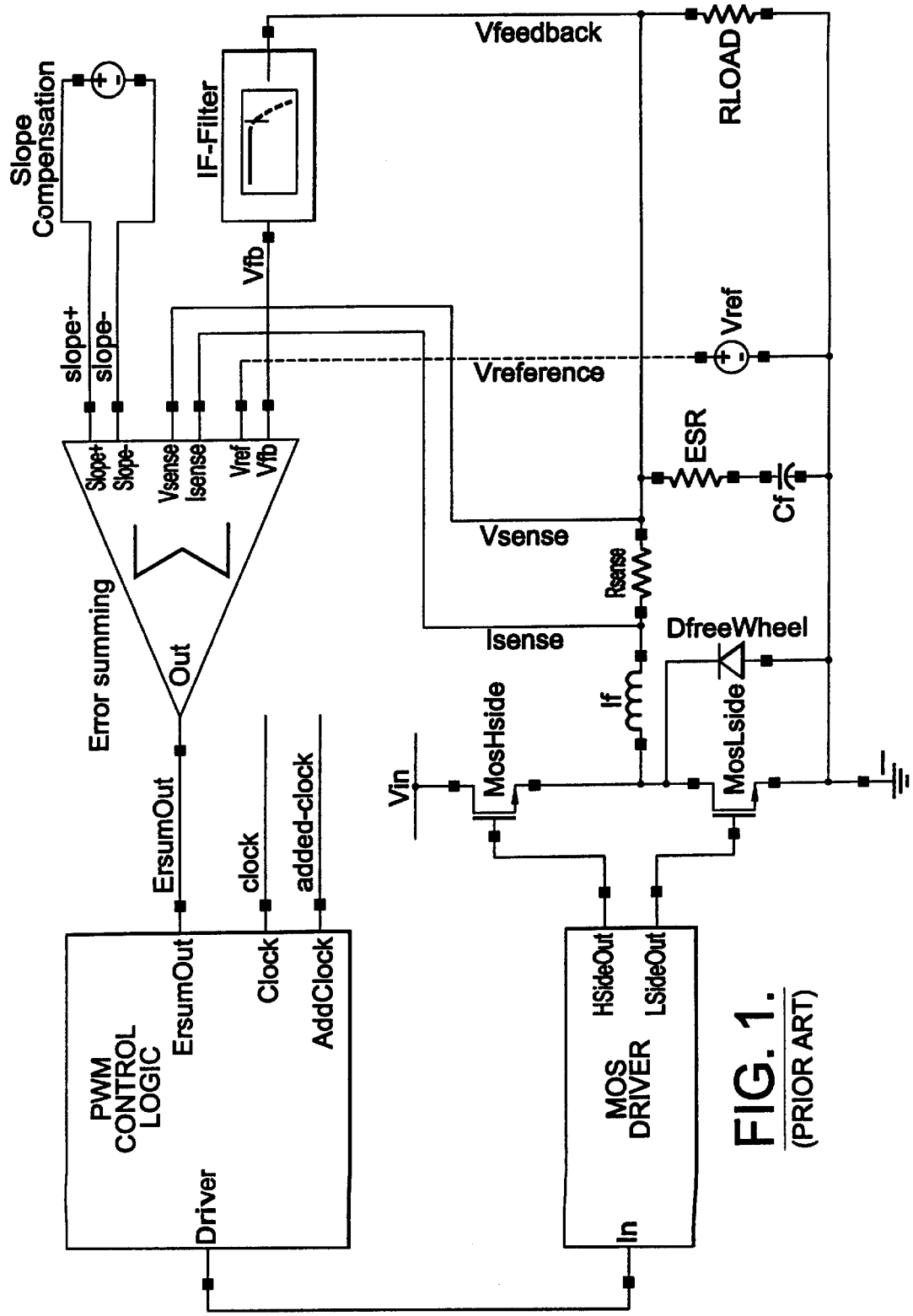
FIG. 1 shows the basic scheme of a current mode switching converter, as discussed above according to the prior art.
Figure 2:
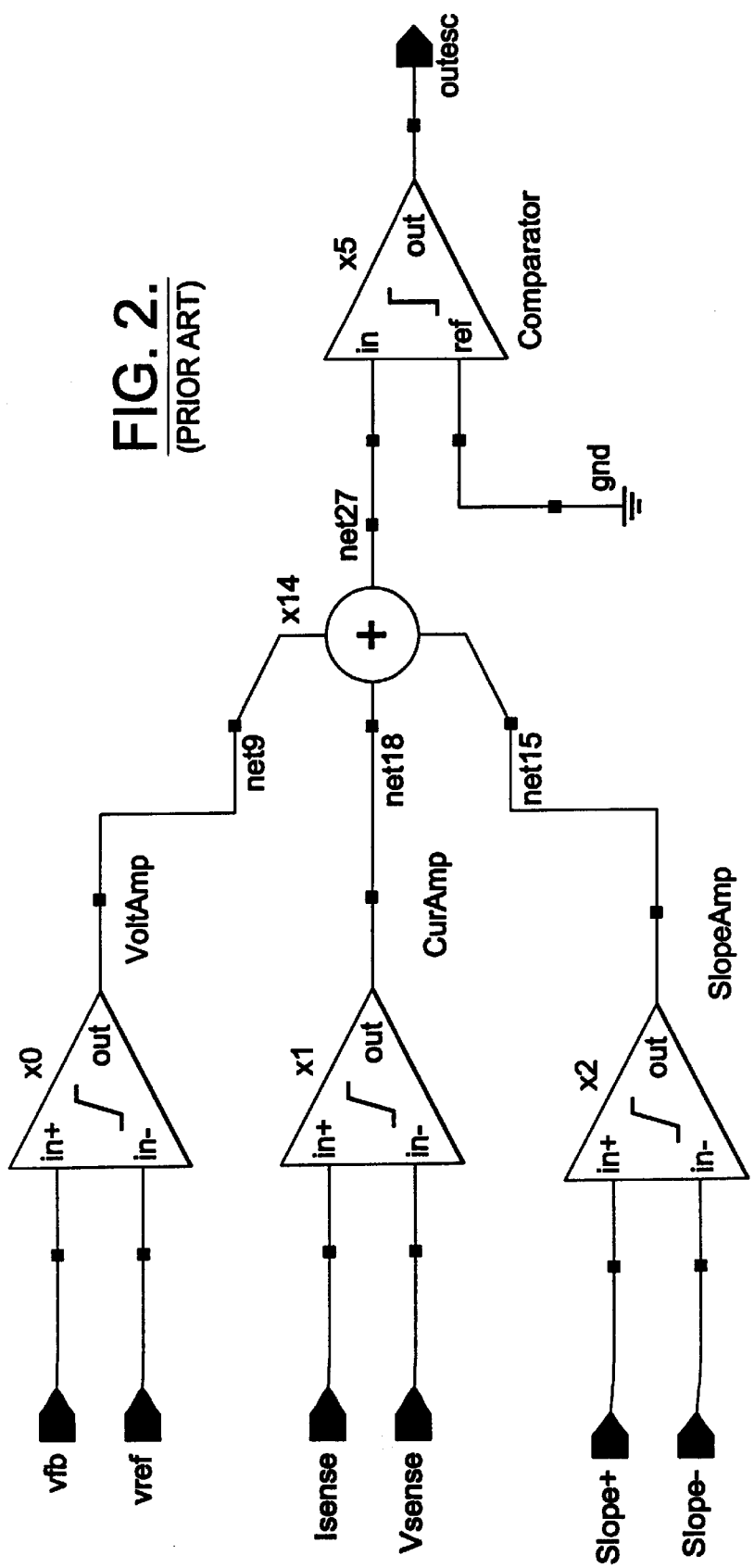
FIG. 2 shows in more detail the block Σ of the converter of FIG. 1, as already described above according to the prior art.
Figure 3:
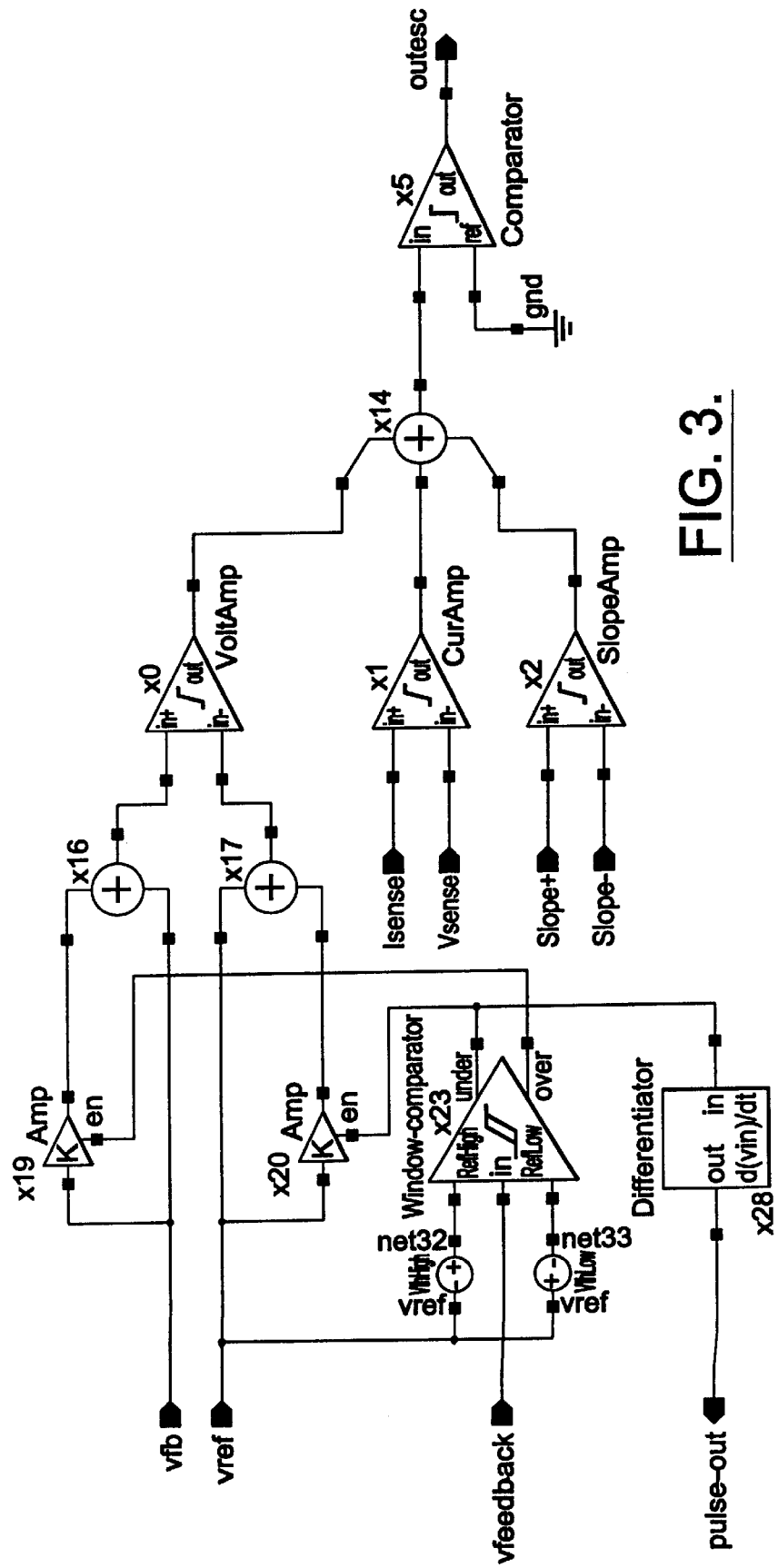
FIG. 3 is a diagram of the block Σ of FIG. 2, modified according to the present invention.
Figure 4:
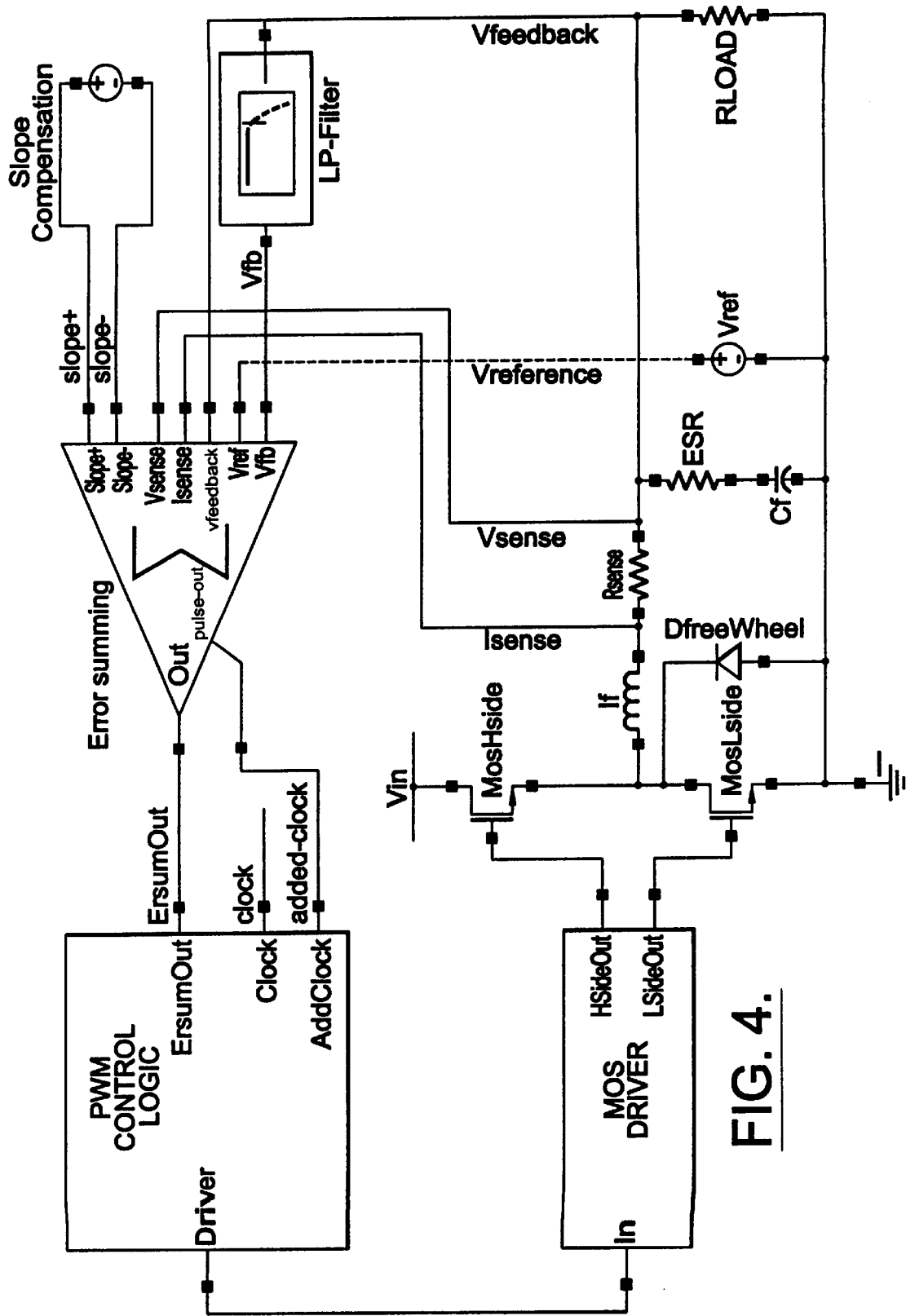
FIG. 4 shows switching current mode converter similar to that of FIG. 1, with a modified block Σ according to the present invention.

By referring to the case of a switching DC—DC converter of the so-called Vac type controlled in current mode, whose typical circuit topology is reproduced in FIGS. 1 and 2, FIGS. 3 and 4 show the converter realized according to the present invention. FIGS. 3 and 4 highlight, by way of comparison, the additional elements that are introduced in accordance with the present invention. In particular, FIG. 4 shows the diagram of the error summing block Σ modified according to the invention. Upon comparing the diagram of FIG. 4 with the known diagram of FIG. 2, the following additional blocks are present:

a window comparator to which a voltage Vfeedback that is the unfiltered output voltage Vout of the converter is fed at its input, and to which two voltages, namely: VthHigh and VthLow are applied, both referred to the reference voltage Vref, that is, to the control voltage reference of the converter and producing two output signals, namely: "under" and "over";

a differentiator which at the incoming of a rising front of the signal "under" generates an output pulse whose duration is of about 100 ns;

two amplifiers of gain K, activated by the use of an enable signal; these amplifiers are normally off (output at zero) and they output a signal K*Vin only when the respective enable signal is high; and two summing circuits that sum the Vfb or Vref signal to the respective K*Vfb or K*Vref if the latter is not null.

Load Variation Toward Larder Values During a Ton Phase

Figure 5:
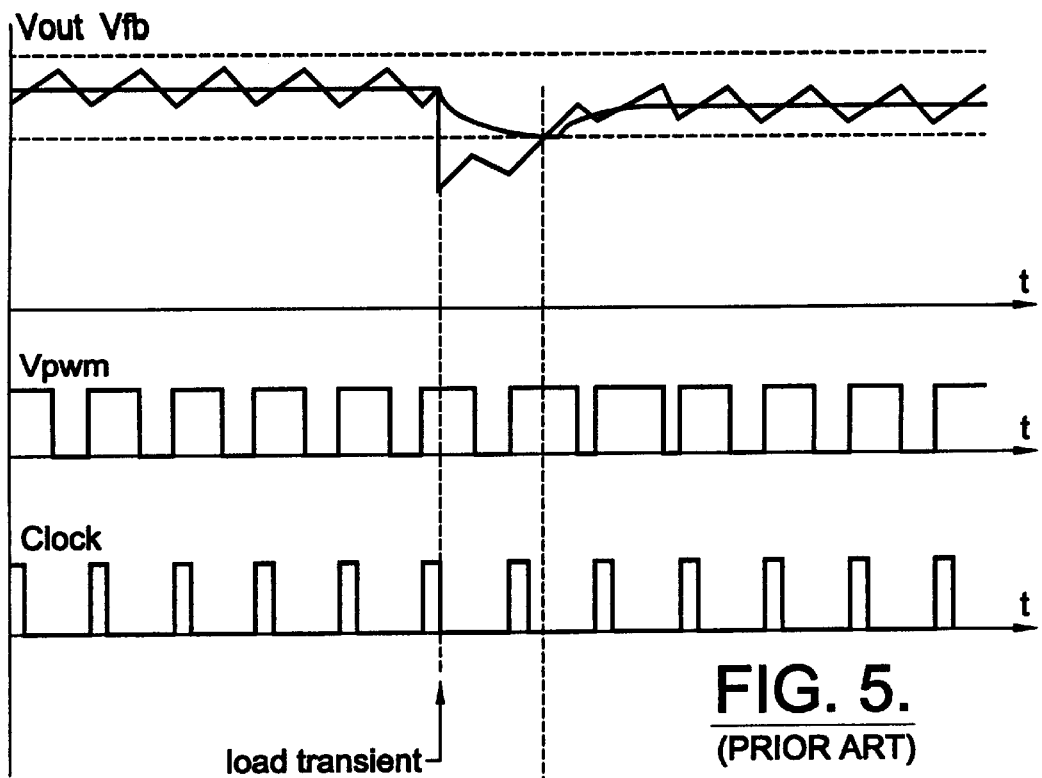
FIGS. 5, 6, 7, 8, 9, and 10 show, for comparison purpose, the different behaviors of the known converter of FIG. 1 and of the converter made according to the present invention of FIG. 4, under different operating conditions.

FIG. 5 illustrates the behavior of a known converter (FIGS. 1 and 2) during normal operating conditions. The figure depicts the voltage Vout of the converter, the voltage Vfb at the output of the feedback loop filter, the voltage Vpwm that is the voltage existing on the source of the Hside MOS transistor and the system's clock. The two dashed lines, just above and below the Vout, define the band of the window comparator used in the converter as modified according to the present invention. They are not pertinent to these diagrams that depict the behavior of the known converter of FIG. 1, but they are shown just for comparison.

Upon the varying of the load toward larger values, the Vout drops abruptly from a value that depends on the Rsense and on the variation of the output current. Due to the low pass filter LP normally introduced for stabilizing the feedback loop, the Vfb voltage which is seen by the error summing block does not follow the actual variation of the output voltage Vout. Therefore, the system does not sense the real variation and acts by correcting an error which is apparently of a lower magnitude. Hence, the duty cycle relative to the current clock pulse is not immediately expanded to the fullest extent, instead, the next clock pulse must be waited for until the Ersum signal will eventually command the maximum correction, in the presence of a further decreased Vfb.

Figure 6:
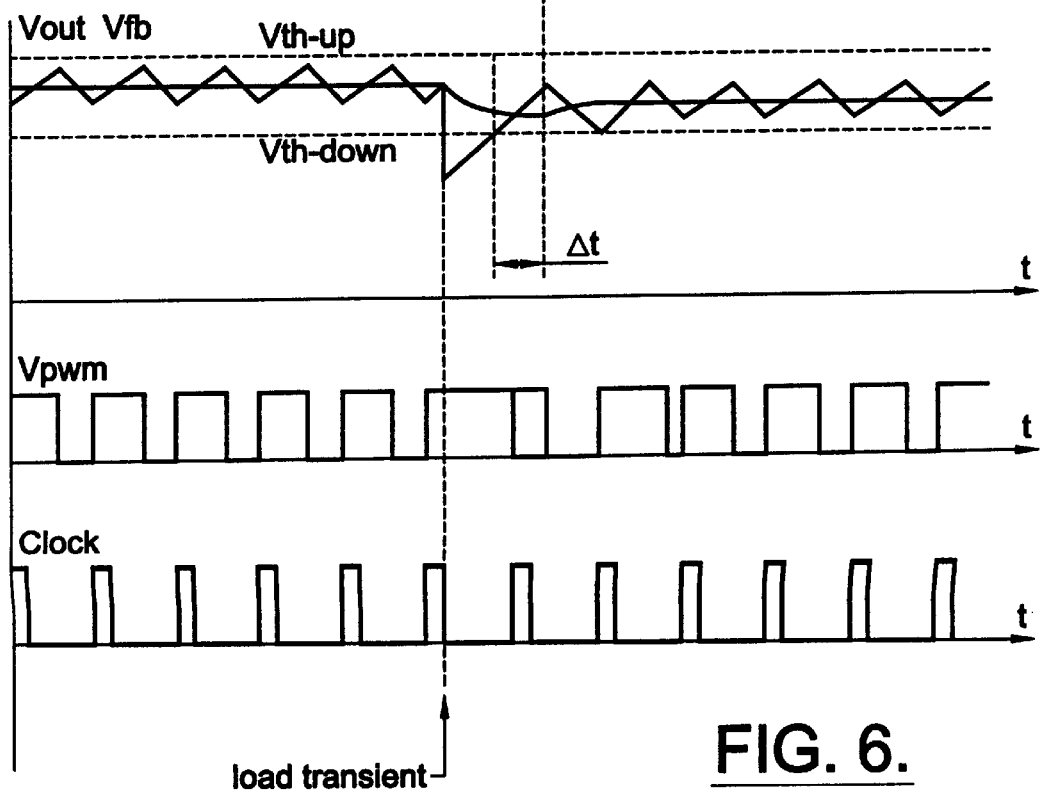

FIG. 6 shows the same situation, but for the case of the converter of the invention depicted in FIGS. 3 and 4. The two thresholds: Vth-up (defined by the dedicated generator Vth-high) and Vth-down (defined by the dedicated generator Vth-low) are set to an appropriate value that is chosen in consideration of the expected current variation and the value of Rsense, normally between +/−50 mV and +/−100 mV. At the instant when the Vout voltage decreases abruptly because of the load variation, the Vth-down threshold is exceeded and the window comparator X23 generates its output signal "under", which enables the amplifier X20 placed on the Vref line. The correcting signal which was equal to:

$$Verr=Vfb-Vref$$

and which at the moment was negative, is raised to the new value given by:

$$Veff=Vfb-(1+K)Vref$$

which is clearly more negative. Hence, this signal forces the error summing block Σ to correct a signal greater than the one that the LP-Ffilter would allow it to perceive, thus expanding the duty cycle of the current clock pulse, and without waiting for the next pulse.

The gain factor K of the two amplifiers X20 and X19 may be freely chosen. The greater correction is obtained for a K that will "saturate" the duty cycle to its maximum value permitted by the MOS-driver. Such value should be computed depending on the particular application, though normal values of K should range between a few units and few tens of units.

To avoid undue interferences of the window comparator X23 during normal operation of the converter, specially when the ripple of the output voltage (Vout*(Vfb)) is near in the average to one of the two thresholds, it is preferred to make the window comparator X23 with a delay ranging between 100 ns and 200 ns depending on the type of application. This will prevent spikes, normally existing on the control voltage, from causing undue interventions and an irregular functioning of the switching controller PWM-control-Logic.

FIG. 6 shows the way the duty cycle has already been fully expanded to its maximum during the current clock pulse without waiting for a complete cycle. To appreciate this advantage, the distance on the time axis between the instants of FIGS. 5 and 6 when the controlled voltage Vout is within the range in which the window comparator is disabled, and, thus, the signal "under" low is highlighted. The indicated distance Δt is the measure of the advantage achieved in terms of faster response speed of the system.

The average value of Δt that may be achieved in current mode converters is about half a clock cycle, meaning from 1 μs to 5 μs, because the working frequency nowadays tends to be between 100 kHZ and 500 kHz. Such an advantage may, in absolute terms, appear not very big, but the stringent speed requisites of power supplies for new generation microprocessors imposes a full exploit of the response speed increase.

Load Variation Toward Larger Values During a Toff Phase

If the load variation occurs at a Toff instant, a further block must be added to obtain the same effect described for the preceding case. Such a block is the differentiator X28 depicted in FIG. 3, which receives as an input the signal "under" output by the window comparator X23, and outputs a pulse whose duration may be of about 100 ns at the incoming of a rising front of the signal "under".

Figure 7:
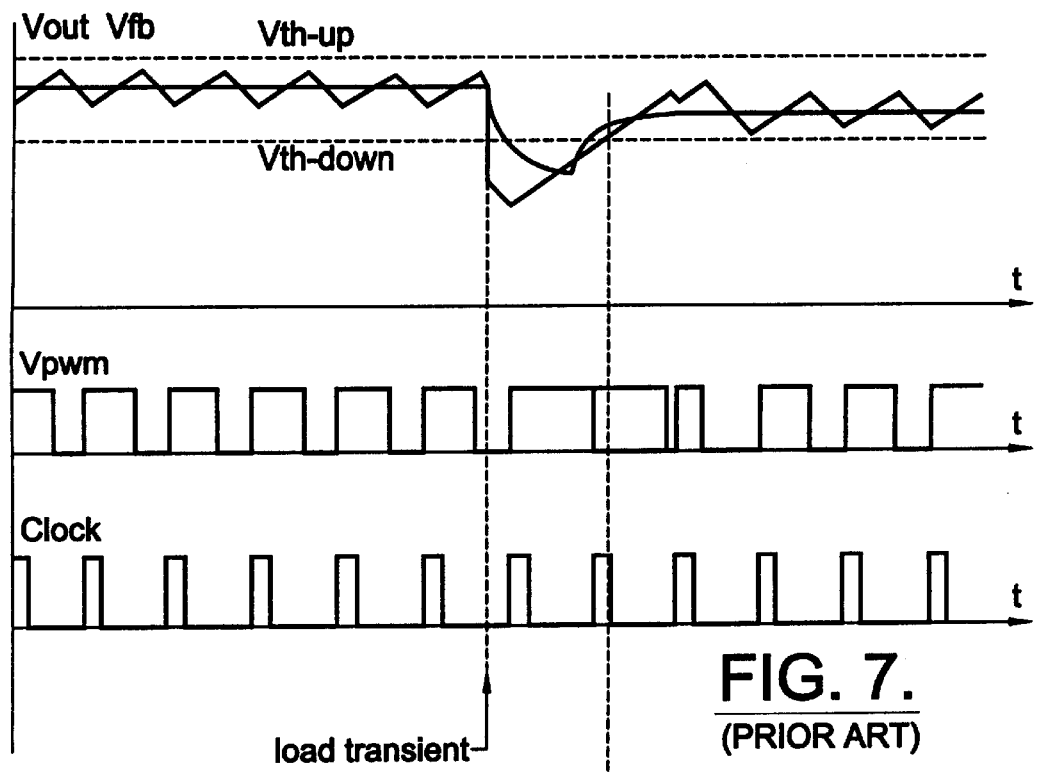
Figure 8:
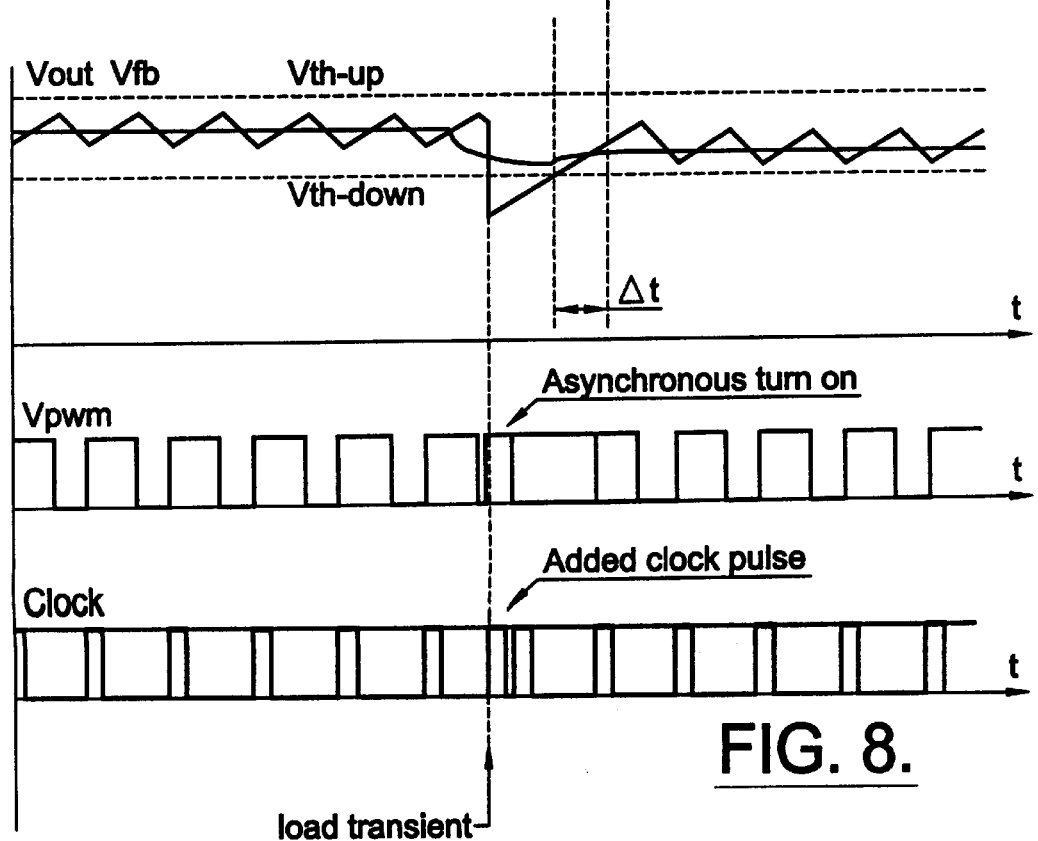

The situation is substantially similar to that previously analyzed. The FIGS. 7 and 8 show, by way of comparison, the behavior of the classical converter of FIGS. 1 and 2 and of the converter of the invention of FIGS. 3 and 4, respectively. The substantial difference is that in this case the load varies (requiring more current) while the MosHside is off, that is during the Toff phase. In the known converter (FIG. 7) there is a synchronous turn-on of the MosHside in synchronism with the next clock pulse available and, only if the loop filter has a sufficiently large time constant of a duration equal to the maximum duty cycle allowed by the system.

The waiting for the next clock pulse lets the output voltage Vout drop further to an undesirably low value. According to the invention, to improve this situation, the signal "under" generated by the window comparator X23 is exploited. Upon the variation of the load the signal "under" turns on the K-gain amplifier X20 thus forcing the error summing block Σ to effect a larger than expected correction, as already explained above.

Such a signal "under" is fed to the input of the differentiator X28 which generates a pulse whose duration is about 100 ns, approximately equal to that of the master clock. This pulse (pulse-out) is sent to the Added Clock input of the PWM-control-logic block, as shown in the diagram of FIG. 4, which simply adds it to the clock signal of the internal oscillator. The effect is shown in FIG. 8, where it may be observed how an asynchronous clock pulse is physically added to allow the system to turn on the MosHside at the very instant the load variation occurs, and, therefore, to recover faster than a prior art system.

It is also observed that the error summing block Σ, at the time of sensing the downward exceeding of the Vth-low threshold, is internally forced in the position of maximum recovery by the signal "under", and, therefore, the duty cycle of the added pulse is already expanded to the fullest measure.

Load Variation Towards Lesser Values

This condition of operation is relatively easier to control because the turn-off of the MosHside is not synchronous, but asynchronous. It is controlled by the error summing block Σ and there is no need to output additional clock pulses.

Figure 9:
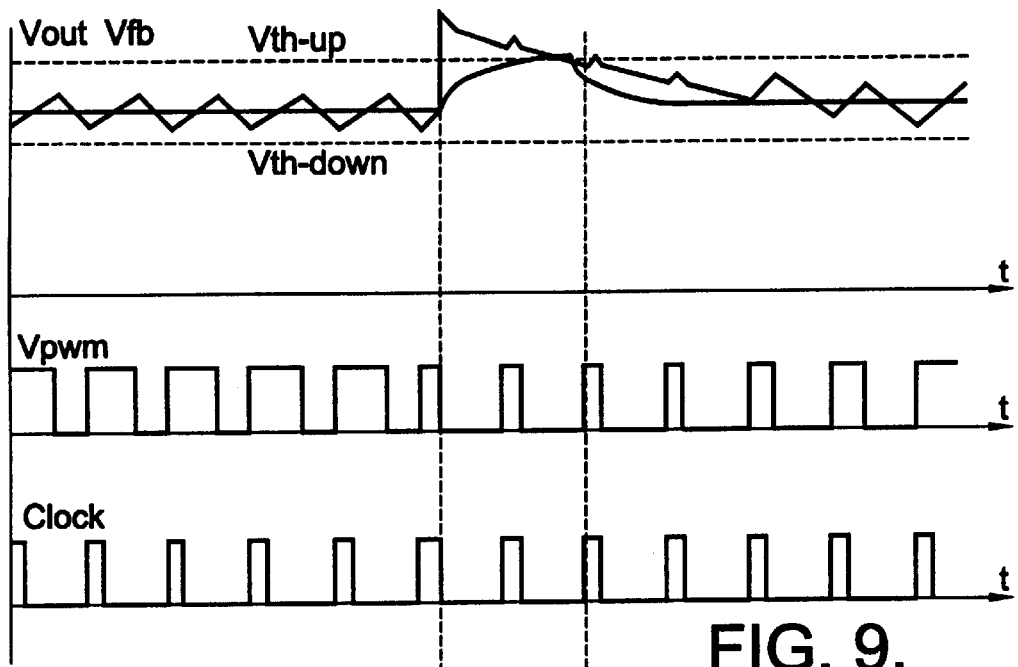

FIG. 9 shows the usual trend of the output voltage Vout of a known current mode converter (FIGS. 1 and 2). Even in this case the voltage feedback to the error summing block by the loop filter tracks the real voltage Vout, but with a certain delay. Therefore, before an eventual complete turn-off, some residual pulses may appear, for a few clock cycles, because the voltage at the Ersum input of the PWM block is much lower than the real voltage Vout. This provokes, even if in a less accentuated form than previously analyzed situations, a delay in relation to the theoretical recovery time of the system.

Figure 10:
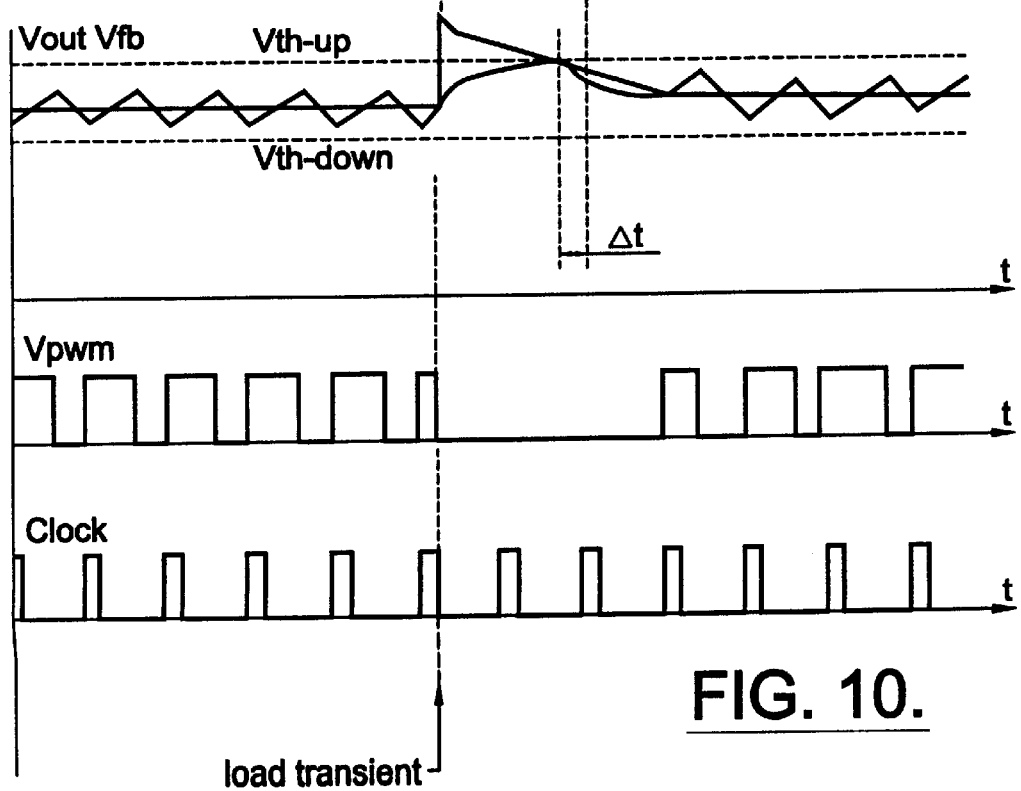

FIG. 10 shows the same situation, for the case of the converter of the invention of FIGS. 3 and 4. When crossing the Vth-up threshold, the window comparator X23 generates the signal "over" that enables the amplifier X19 present on the Vfb line.

The correcting signal that was:

$$Verr = Vfb - Vref$$

and therefore positive, is now raised to the new value given by:

$$Veff = (1+K)Vfb - Vref$$

which is evidently more positive, and, therefore, is over corrected by the system by reducing the duty cycle more that it would otherwise do. Even in this case, the magnitude of the over-forced correction may be chosen freely by changing the gain factor K of the amplifier X19. Permissible values of the gain factor K range between a few units to a few tens. The achieved increment of the recovery speed, if compared to a classical current mode control system, increases with the switching period and thereby with the decreasing of the working frequency of the converter.

That which is claimed is:

1. A switching DC—DC converter operating in a current mode comprising:
   a half-bridge power stage comprising a high side power device and a low side power device connected in series between two supply nodes;
   a driver for the half-bridge power stage;
   an inductor connected to an output of the converter;
   a current sensing resistor connected in series with said output inductor for generating a sensed output voltage;
   a pulse width modulation controller for controlling said driver responsive to the sensed output voltage, the pulse width modulation controller having an input for receiving added clock pulses;
   a low pass filter connected to the output of the converter for generating a filtered feedback signal; and
   a feedback comparator/amplifier block generating a logic signal enabling turn-on of at least one of said power devices based upon an error signal between the filtered feedback signal and a reference voltage, said feedback comparator/amplifier block for reducing the recovery time of the output voltage of the converter for abrupt load variations and comprising a first error amplifier having inverting and non-inverting inputs, a window comparator having a first input receiving an actual feedback signal representative of the output voltage of the converter and having two other inputs receiving respective threshold voltages both referred to the reference voltage, said window comparator having a first output and a second output onto which a respective logic signal is generated when the output voltage of the converter exceeds a respective threshold voltage, a differentiating circuit having an input coupled to the first output of said window comparator and an output coupled to the input for added clock pulses of said pulse width modulation control logic, a first amplifier enabled by the first output of said window comparator having a predetermined value, a first summing circuit having an input connected to the actual feedback signal and an output and an output connected to the non-inverting input of said first error amplifier, a second amplifier enabled by the second output of said window comparator having a predetermined value, and a second summing circuit having an input connected to the reference voltage and an output connected to the inverting input of said first error amplifier.

2. A DC—DC converter according to claim 1, further comprising a second error amplifier having inputs receiving the sensed output voltage.

3. A DC—DC converter according to claim 2, further comprising a third error amplifier having inputs receiving a slope compensation signal.

4. A DC—DC converter according to claim 3, further comprising a third summing circuit having respective inputs connected to the outputs of the first, second and third error amplifiers.

5. A DC—DC converter according to claim 4, further comprising a comparator downstream from said third summing circuit.

6. A DC—DC converter according to claim 1, wherein said window comparator has a delay in a range of about 100 ns to 200 ns.

7. A DC—DC switching converter operating in a current mode comprising:

at least one power device and a driver therefor;

a pulse width modulation controller for controlling said driver;

a low pass filter connected to the output of the converter for generating a filtered feedback signal;

a feedback comparator/amplifier block generating a signal enabling turn-on of said at least one power device based upon an error between the filtered feedback signal and a reference voltage, said feedback comparator/amplifier block comprising a first error amplifier, a window comparator having a first input receiving an actual feedback signal representative of the output voltage of the converter and having two other inputs receiving respective high and low threshold signals both referred to the reference voltage, said window comparator generating a first output signal responsive to the actual feedback voltage being below the low threshold signal and generating a second output signal responsive to the actual feedback voltage being above than the high threshold signal, a first amplifier enabled by the first output signal of said window comparator, a first summing circuit having an input connected to the actual feedback signal and an output connected to a first input of said first error amplifier, a second amplifier enabled by the second output signal of said window comparator, and a second summing circuit having an input connected to the reference voltage and an output connected to a second input of said first error amplifier.

8. A DC—DC converter according to claim 7, wherein said pulse width modulation controller has an input for receiving added clock pulses; and further comprising a differentiating circuit having an input coupled to the first output of said window comparator and an output coupled to the input for added clock pulses of said pulse width modulation controller.

9. A DC—DC converter according to claim 8, further comprising:

an inductor connected to an output of the converter; and a current sensing resistor connected in series with said output inductor for generating a sensed output voltage.

10. A DC—DC converter according to claim 9, further comprising a second error amplifier having inputs receiving the sensed output voltage.

11. A DC—DC converter according to claim 10, further comprising a third error amplifier having inputs receiving a slope compensation signal.

12. A DC—DC converter according to claim 11, further comprising a third summing circuit having respective inputs connected to the outputs of the first, second and third error amplifiers.

13. A DC—DC converter according to claim 12, further comprising a comparator downstream from said third summing circuit.

14. A DC—DC converter according to claim 8, wherein said window comparator has a delay in a range of about 100 ns to 200 ns.

15. A DC—DC converter according to claim 7, wherein said at least one power device comprises a high side MOS power device, and a low side MOS power device.

16. A method for operating a DC—DC switching converter operating in a current mode comprising the steps of:

controlling a driving circuit for at least one power device with a pulse width modulation controller;

generating a filtered feedback signal using a low pass filter connected to the output of the converter;

generating a logic signal enabling turn-on of the at least one power device based upon an error signal between the filtered feedback signal and a reference voltage by using a first error amplifier, the step of generating comprising the steps of generating a first output signal responsive to the actual feedback voltage being below a low threshold signal and generating a second output signal responsive to the actual feedback voltage being above than a high threshold signal, enabling a first amplifier by the first output signal and enabling a second amplifier by the second output signal, summing the actual feedback signal and an output of the first amplifier and coupling the sum to a first input of the first error amplifier, and summing a reference voltage and an output of the second amplifier to a second input of the first error amplifier.

17. A method according to claim 16, further comprising the step of adding clock pulses during the step of controlling using a differentiator connected to the first output signal.

* * * * *

UNITED STATES PATENT AND TRADEMARK OFFICE
CERTIFICATE OF CORRECTION

PATENT NO. : 5,956,239
DATED : September 21, 1999
INVENTOR(S) : GIACOMINI

It is certified that error appears in the above-identified patent and that said Letters Patent is hereby corrected as shown below:

Column 1, line 20     Strike: "continues"
                             Insert: --continuos--.

Column 4, line 4      Strike: "Larder"
                             Insert: -- Larger --

Column 5, line 15     Strike: "At"
                             Insert: -- $\Delta t$ --

Signed and Sealed this

Fourth Day of July, 2000

Attest:

Q. TODD DICKINSON

*Attesting Officer*                  *Director of Patents and Trademarks*